United States Patent [19]

Gulgielmo, Sr.

[11] Patent Number: 4,698,097

[45] Date of Patent: Oct. 6, 1987

[54] NET ANTIFOULING COMPOSITION

[75] Inventor: Richard J. Gulgielmo, Sr., Cresskill, N.J.

[73] Assignee: EMA Company, Cresskill, N.J.

[21] Appl. No.: 508,520

[22] Filed: Jun. 27, 1983

Related U.S. Application Data

[63] Continuation-in-part of Ser. No. 888,373, Mar. 20, 1978, Pat. No. 4,393,102, and a continuation-in-part of Ser. No. 341,275, Jan. 21, 1982, abandoned.

[51] Int. Cl.$^4$ .............................................. C09D 5/14
[52] U.S. Cl. ................................... 106/15.05; 106/16; 106/17; 424/288
[58] Field of Search ..................... 424/288; 106/15.05, 106/16, 17

[56] References Cited

U.S. PATENT DOCUMENTS

| | | | |
|---|---|---|---|
| 3,344,019 | 9/1967 | Sowa | 424/288 |
| 3,480,712 | 11/1969 | Thompson | 424/288 |
| 3,639,583 | 2/1972 | Cardarell et al. | 424/288 |
| 3,702,360 | 11/1972 | Graham | 424/288 |

Primary Examiner—Robert A. Wax
Attorney, Agent, or Firm—Louis E. Marn

[57] ABSTRACT

There is disclosed a net antifouling composition for use on nettings and comprised of from 2 to 10 percent, preferably 3–6 percent by weight of a tri-n-butyl tin ester selected from the group consisting of tri-n-butyl tin linoleate, bis(tri-n-butyl) tin succinate, tri-n-butyl tin benzoate, bis tri-n-butyl tin salicylate and mixtures thereof in an organic solvent system or a water base system, perferably a water base system, for controlling algae and invertebrate growth.

1 Claim, 4 Drawing Figures

NET ANTIFOULING COMPOSITION

FIELD OF THE INVENTION

This application is a continuation-in-part of U.S. Application Ser. No. 888,373, filed Mar. 20, 1978, now U.S. Pat. Nos. 4,393,102 and 341,275, filed Jan. 21, 1982, now abandoned. This invention relates to a composition of matter and a process for using same, and more particularly to an antifouling composition for treating nets, and in particular aquaculture, pond and weir fishing nets which are stationary under water fishing nets.

BACKGROUND OF THE INVENTION

It has been found that many types of nettings, exposed to sea and lake waters, experience heavy levels of clogging due to algae and invertebrates. Such clogging limits the flow of water and deposited organisms in the enclosed area with concomitant weight increases as high as 1000 percent. Such a weight increase results in the sinking of the supported netting and fish escape as well as making it practically impossible to raise the netting for cleaning. In some instances, the cutting away of netting is necessitated resulting in the loss of netting. In addition to netting losses, fish may also be lost or harmed. Salt and freshwater aquaculture systems have traditionally been plagued by heavy fouling on nets, cages, intake pipes and aeration systems. Nets particularly have suffered from heavy incrustation making them inordinately heavy, and eventually incapable of permitting water, flow-through. Natural food penetration, acceptable oxygen levels and detritus removal are severely restricted, leading to poor crop yield. Labor for frequent cleaning adds high costs and full cage utilization is not possible because of cage rotation during cleaning. Antifouling compounds have been used for centuries with only partial success. Traditional antifouling coating treatments have relied on copper and mercury compounds which are effective anti-foulants but are highly toxic and can be damaging to systems in which live organisms are expected to survive.

In the hereinabove mentioned co-pending applications, there is disclosed a net finishing composition in a suitable solvent system which when coated on a net substrate, particularly a nylon net substrate of a mesh size of from ¼ to 24 inches, substantially improves the integrity of the net substrate concomitantly improving seining qualities in terms of improved daily catch. The net fishing composition is comprised of a low molecular weight, high acetate content, vinyl chloride copolymer, a monomeric plasticizer and a polymeric plasticizer. The molecular weight of the copolymer is from 20,000 to 65,000 and of an acetate content of from 10-20 percent by weight. The plasticizers are present in an amount of from 40 to 60 parts, preferably 50 parts per 100 parts of the copolymer with the ratio on monomeric plasticizer to polymeric plasticizer ranging from about 1:1 to 3:1, preferably 2:1. It is also disclosed that antifouling properties could be improved by adding certain organo tin esters dissolved or dispersed in the solvent system.

In U.S. Pat. No. 4.010,141 to Onozuka et al. there is disclosed a plurality of tin compounds, and in particular dimethyl, n-alkyl tin esters of improved antifouling characteristics. While such trialkyl tin esters have shown some efficacy, such trialkyl tin esters are compatible with the plasticizers in the resin and can readily leach out or can be locked into the film after application to a netting substrate.

OBJECTS OF THE INVENTION

An object of the present invention is to provide a net antifouling composition exhibiting substantial efficacy over extended periods of time after netting application.

Another object of the present invention is to provide a net antifouling composition readily applied to a netting substrate.

Still another object of the present invention is to provide a net antifouling composition which does not deleteriously affect the fish catch.

Yet another object of the present invention is to provide a net antifouling composition which leaches out at a controlled rate from the net substrate.

A further object of the present invention is to provide a net antifouling composition having a soft enough finish and being flexible which will not damage the fish when they brush against the treated netting.

Still yet another object of the present invention is to provide a net antifouling composition capable of lowering operating costs resulting from reduced labor time in cleaning and maintenance of the netting.

Another object of the present invention is to provide a net antifouling composition reducible with water instead of flammable solvents or tars allowing for simpler and safer application.

Still another object of the present invention is to provide a net antifouling composition that does not wear off the netting above the water line.

Yet another object of the present invention is to provide a net antifouling composition capable of protecting a treated net exposed to sunlight.

Still yet another object of the present invention is to provide a net antifouling composition more resistant to abrasion.

SUMMARY OF THE INVENTION

These and other objects of the present invention are achieved by a net antifouling composition for use on nettings and comprised of from 2 to 10 percent, preferably 3–6 percent by weight of a tri-n-butyl tin ester selected from the group consisting of tri-n-butyl tin linoleate, bis(tri-n-butyl) tin succinate, tri-n-butyl tin benzoate, bis tri-n-butyl tin salicylate and mixtures thereof in an organic solvent system or a water base system, preferably a water base system, for controlling algae and invertebrate growth. In one aspect of the present invention, the tri-n-butyl tin esters may be admixed with a net finishing composition as disclosed in the hereinabove mentioned co-pending applications.

BRIEF DESCRIPTION OF THE DRAWING

An understanding of the invention will be faciliated by reference to the photographs on the drawing and the accompanying detailed description, wherein.

DETAILED DESCRIPTION OF THE INVENTION

Figure 2A:
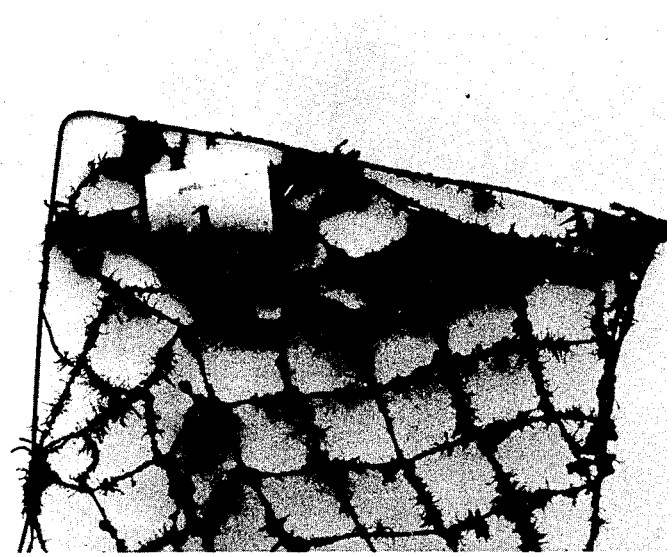
FIGS. 2A and 2B are photographs of untreated fish netting.

The tri-n-butyl tin esters used in the present invention are selected from the group consisting of tri-n-butyl tin linoleate, bis(tri-n-butyl) tin succinate, tri-n-butyl tin benzoate, tri-n-butyl tin salicylate and mixtures thereof.

The tri-n-butyl tin ester is added in an amount of from 2 to 10, preferably 3–6 percent by weight to either an organic solvent system or a water base system, preferably a water base system.

The essential components of a concentrate forming the preservative system of the present invention are a tri-n-butyl tin ester and filler such as clay. The tri-n-butyl tin ester and filler are mixed in a ratio of 1 part of tri-n-butyl tin ester to 1–4 parts of filler and more preferably 1 part of bis tri-n-butyl tin ester to 2–3 parts of filler. The filler acts as a buffering agent and helps releases the toxicant, tri-n-butyl tin ester. In preparation for treating the netting, the preservative system concentrate is added to a water base or organic base solvent system.

The essential components of the water base solvent system are the tri-n-butyl tin ester and filler, such as clay concentrate in addition to binders such as acrylic/vinyl latexes, styrene latex, styrene/acrylic latexes, vinyl chloride, vinyl chloride acetate, acrylonitrile latexes and the like. Also added to the water based solvent system are wetting agents, suspending agents, coalescent agents, pigments and water.

If an organic base solvent system is used, the essential components of the organic base system are tri-n-butyl tin ester, a solution resin, such as a vinyl chloride-vinyl acetate co-polymer, plasticizers, stabilizers, pigments and organic solvents.

In one embodiment of the present invention the tri-n-butyl tin ester selected from the group consisting of tri-n-butyl tin linoleate, bis(tri-n-butyl tin succinate, tri-n-butyl tin benzoate, tri-n-butyl tin salicylate and mixtures thereof, is added in an amount from 2 to 10 percent by weight to a net finishing composition comprised of a resin system dissolved in a solvent system, such that the solids content of the resulting composition of matter is not less than about 20% by weight, and between 20% to about 50% solids, with a preferable solids range of about 30 to 40% by weight.

A method of application of the net antifouling composition of the present invention is achieved by dipping a net in a tank containing the preservative system admixed with a solvent system. When the net is dipped in the tank that portion of the net dipped should be allowed to set in the tank for about 10 seconds to about 30 minutes with a preferable time limit being approximately 3–5 minutes.

Although the net treated with the preservative system in a solvent system can be utilized when it becomes dry to the touch it is preferable that the net antifouling composition be allowed to cure on the net. The purpose of curing allows for the vaporization or evaporation of the solvent system and the absorbtion of the preservative system into the net. The preservative system should be allowed to cure from about 4 to 96 hours, with a preferable curing time of 48 to 72 hours prior to use.

It has been found that a net treated with the antifouling composition having a minimum weight pick up of 30% on the net of the present invention results in a coated net exhibiting after a long term test period an increase of weight of only about 5 percent as compared to a control net (without the organo tin ester coating) exhibiting a weight increase of greater than 500 percent.

Referring to FIGS. 1A, 1B, 2A and 2B, there are shown photographs of treated and untreated nets with the net antifouling composition demonstrating the efficacy of the present invention. Such efficacy has been repeatedly demonstrated whether in the fresh waters of the Great Lakes Region or the salt water of the Florida Keys, the Gulf, Cape Hatteras, Nova Scotia and the like.

EXAMPLE OF THE INVENTION

The following examples are illustrative of the present invention:

EXAMPLE 1

A nylon fish net is treated in a water based net antifouling composition of the components as set forth in Table 1, below:

TABLE I

| COMPONENTS | PARTS |
| --- | --- |
| Water | 42.00 |
| Sodium Tri Poly Phosphate | .20 |
| Non-Ionic Surface Active Agent | .20 |
| Hydroxy Ethyl Cellulose | .50 |
| Tri-n-butyl tin linoleate | 5.30 |
| China clay | 13.35 |
| Anti-Foaming Agent | .25 |
| Ethylene Glycol | 1.10 |
| Diethylene Glycol Mono Ethyl Ether | 1.10 |
| Pigments | 3.00 |
| Vinyl chloride acrylic copolymer latex | 33.00 |
| | 100.00 |

The solution is introduced into a trough at ambient temperature. A fishing net having a mesh size in the range of from 0.25 to 24 inches is continously introduced into the trough and withdrawn, such that incremental sections of net remain in the solution of from 10 seconds to 10 minutes or can be dipped in a tank and allowed to drain.

The antifouling composition coated on the net dries in about 4 to 6 hours. The net antifouling composition is permitted to cure on the net for a period of approximately 72 hours before net usage.

EXAMPLE II

A nylon fish net is treated in an organic solvent based net antifouling composition having the following components:

TABLE II

| COMPONENTS | PARTS |
| --- | --- |
| Xylene-Xylol(ortho) Aromatic solvent | 40.30 |
| M.I.B.K. (methyl isobutyl ketone) ketone solvent | 30.35 |
| Polymeric plasticizer dibasic acid and glycol 409/429 Monsanto Chemical | 2.80 |
| Di octyl/phthalate (DOP) Di-2-ethylhexyl/phthalate | 2.45 |
| Vinyl chloride-vinyl acetate copolymer-resin Ex: VC113/Borden Chemical | 16.80 |
| QSUV stabilizer | .10 |
| Black Pigment | 4.10 |
| Bis(tri-n-butyl)tin succinate | .81 |
| Tri-n-Butyltin benzoate | .96 |
| Tri-n-Butyltin linoleate | 1.33 |
| | 100.00 |

A net coated with the above referenced antifouling composition was submerged in the ocean off of the British Coast along with a control net which was not treated for a period of 22 weeks. The control net treated with the net antifouling composition had an initial weight of 377 pounds prior to being deposited on the sea floor. The untreated net (treated without antifouling composition) had an initial weight of 418 pounds prior to submersion.

Figure 1A:
FIGS. 1A and 1B are photographs of a fish netting treated with the present invention.
Figure 1B:
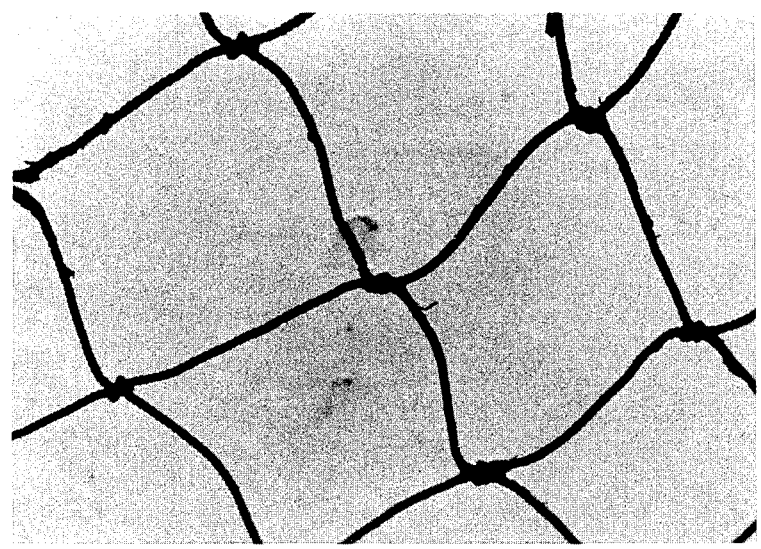

Now referring to FIGS. 1A and 1B there are shown photographs of the net treated with the antifouling composition after it was removed from the sea floor. It was found to weigh 660 pounds after its removal. This was a weight increase of only 43.2%. Additionally, it was found that approximately 10% of the treated net was fouled, with the primary fouling organism being hydrozoan.

Figure 2B:

Now referring to FIGS. 2A and 2B, there are shown photographs of the control net after its removal from the sea floor. Upon removal it was found to weigh 1190 pounds, thus having a weight increase of almost 185%. Approximately, 90% of the net was fouled with the primary fouling organisms being hydrozoan, mussels and sea squirts.

While the invention has been described in connection with the exemplary embodiment thereof, it will be understood that many modifications will be apparent to those of ordinary skill in the art and that this application is intended to cover any adaptions or variations thereof. Therefore, it is manifestly intended that this invention be only limited by the claims and the equivalents thereof.

What is claimed is:

1. An antifouling composition comprised of a tri-n-butyl tin ester selected from the group consisting of tri-n-butyl tin linoleate, bis(tri-n-butyl) tin succinate, tri-n-butyl tin benzoate, tri-n-butyl tin salicylate and mixtures thereof in an amount of from 2 to 10 percent by weight in a resin system dissolved in a solvent system wherein the resulting mixture yields a solids content of from 20% to about 50% solids by weight.

* * * * *

UNITED STATES PATENT AND TRADEMARK OFFICE
CERTIFICATE OF CORRECTION

PATENT NO. : 4,698,097
DATED : OCTOBER 6, 1987
INVENTOR(S) : RICHARD J. GUGLIELMO, SR.

It is certified that error appears in the above-identified patent and that said Letters Patent is hereby corrected as shown below: Title page:

Please correct the spelling of inventor's name to read as above "RICHARD J. GUGLIELMO, SR.

Signed and Sealed this

Seventeenth Day of May, 1988

Attest:

DONALD J. QUIGG

Attesting Officer

Commissioner of Patents and Trademarks